May 28, 1963  H. E. COY  3,091,143
CLAMP MANIPULATING DEVICE
Filed Oct. 27, 1960  2 Sheets-Sheet 1

INVENTOR.
HOMER E. COY
BY  M. A. Hobbs
ATTORNEY

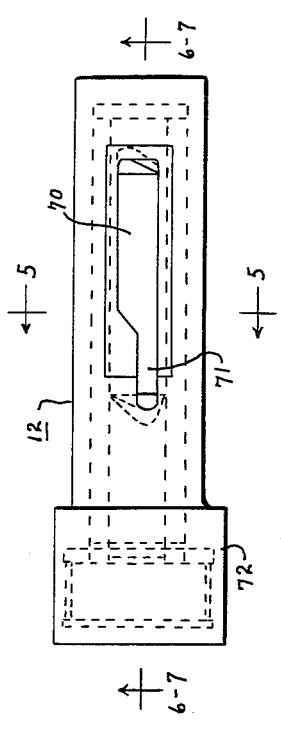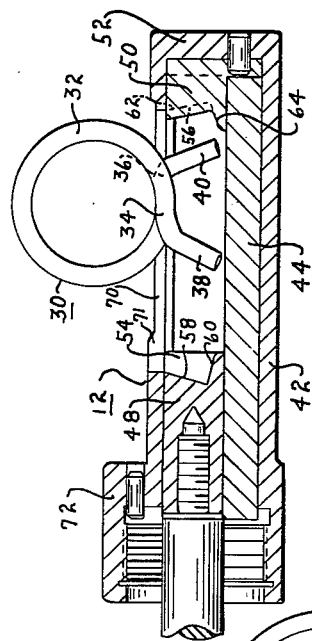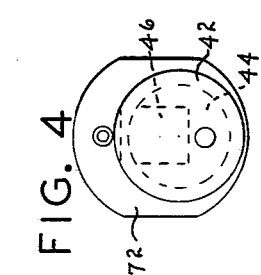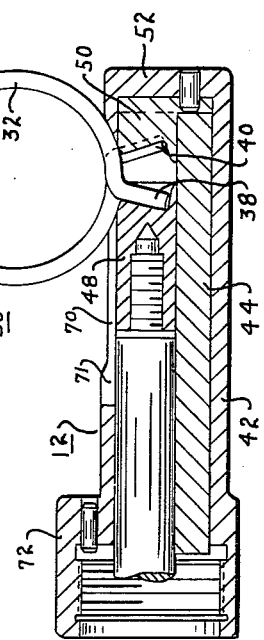

United States Patent Office 3,091,143
Patented May 28, 1963

3,091,143
CLAMP MANIPULATING DEVICE
Homer E. Coy, South Bend, Ind., assignor to Ace Tool Engineering Co., Inc., South Bend, Ind., a corporation of Indiana
Filed Oct. 27, 1960, Ser. No. 65,521
6 Claims. (Cl. 81—9.3)

The present invention relates to a clamp manipulating device, and more particularly to a mechanism for expanding and mounting clamps on hose and the like.

Installing conventional clamps consisting of a single loop of resilient wire with radially projecting ends is frequently a difficult operation, in that the location of the hose connection on which the clamp is assembled is often hard to reach and in confined areas so that effective manipulation of the clamp once the location is reached is not possible. Various types of manually operated tools have been used in the past, but these often require the operator to extend his arm or hand into the confined area where movement of the tool is difficult and the operation hazardous, or due to bulkiness of the tool itself, remote and confined places cannot be reached. It is therefore one of the principal objects of the invention to provide a power operated tool for expanding and mounting clamps of the looped wire type for coupling hose and the like to a connection, which is relatively long and sufficiently compact to extend into confined places, and which requires no additional space in which to operate to release the clamp once it is mounted in place on the hose.

Another object of the invention is to provide a clamp manipulating device of the aforesaid type which can be fully and easily operated with one hand, both to expand the clamp for mounting on a hose connection and to release the clamp once it has been assembled in place on the connection.

Still another object of the invention is to provide a device for expanding clamps of the resilient wire loop type having radially extending ends which are inserted into an elongated tubular body and manipulated to expand the loop portion, and which are held firmly in the operating mechanism until released after the clamp has been assembled in place on the hose connection.

A further object is to provide a clamp expanding device of the aforesaid type in which all the moving parts are enclosed, leaving only the expanded clamp protruding from the operating end of the device throughout the clamp installation operation.

Additional objects and advantages of the invention will become apparent from the following description and accompanying drawings, wherein:

FIGURE 3 is an enlarged top plan view of the operating head of the clamp manipulating device shown in FIGURES 1 and 2;

FIGURE 4 is an end elevational view of the operating head shown in FIGURE 3;

FIGURE 5 is a vertical cross sectional view of the operating head shown in the preceding figures, taken on line 5—5 of FIGURE 3;

Figure 1:
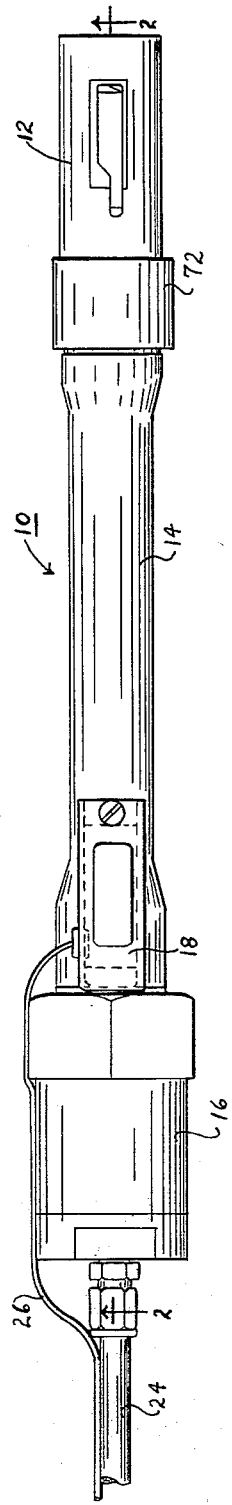
FIGURE 1 is a top plan view of my clamp manipulating device.

FIGURE 6 is a vertical cross sectional view through the operating head, taken on line 6—6 of FIGURE 3, showing a wire loop clamp positioned therein, preparatory to being expanded for assembly on a hose connection; and FIGURE 7 is a vertical cross sectional view of the opearting head taken on line 7—7 of FIGURE 3, showing the wire loop clamp in its expanded position ready to be mounted on a hose connection.

Referring more specifically to the drawings, numeral 10 indicates generally my clamp manipulating device, consisting of an operating head 12, barrell 14 on which head 12 is mounted, an operating cylinder 16 to which barrel 14 is secured, and a control switch 18 supported on a bracket 20 attached to the clamp manipulating device between barrel 14 and cylinder 16.

The embodiment of the present clamp manipulating device shown in the drawings is pneumatically operated, the compressed air for operating the unit being supplied through a hose 24 from a suitable source and a solenoid valve (not shown), controlled by switch 18 connected to said solenoid by lead 26. The lead 26 is preferably secured to hose 24 so that the device can be moved freely without any interference from the lead.

A wire loop clamp 30, commonly referred to in the trade as a "Corban" hose clamp for which the present clamp manipulating device is especially adapted to operate, consists of an annular portion 32 having overlapping sections 34 and 36 and respective radially projecting ends 38 and 40 offset from one another. This type of clamp is resilient and it is somewhat less in internal diameter than the external diameter of the hose, so that once it is placed on a hose connection, the hose is compressed inwardly to clamp it firmly on the end of a tube or other type of connection. These clamps are made in various sizes and the present device is adapted to handle a wide range of sizes without any special adjustments being required.

The operating head of the present clamp manipulating device is especially adapted to grip, retain and expand clamps of the foregoing type, and consists of a cylindrical body 42 having an insert 44 forming a longitudinal track 46 extending substantially the full length of body 42. Mounted in track 46 is a movable jaw 48 and a stationary jaw 50, jaw 48 reciprocating in said track 46 throughout substantially the full length thereof, and jaw 50 being rigidly supported in the end of body 42 by end member 52 of said body. The two jaws are provided with facing offset recesses 54 and 56, the offsets corresponding to the offset relationship of radial end members 38 and 40 of clamp 30. Recess 54 of movable jaw 48 is defined by downwardly and inwardly tapering end wall 58 and inwardly and upwardly sloping bottom wall 60. This configuration of end wall and bottom defining recess 54 assists in engaging and holding radial end member 38 firmly in place during the clamp expanding operation, the slope of wall 58 preventing end member 38 from slipping accidentally outwardly from jaw 48. Recess 56 likewise is defined by a downwardly and inwardly sloping wall 62 and an inwardly and upwardly sloping bottom 64, the tapered inwardly and downwardly sloping wall 62 engaging and firmly holding end member 40 when the member is pressed inwardly into recess 56 by the operation of movable jaw 48. In order to facilitate the alignment of end member 38 with recess 54 and end member 40 with recess 56, cylindrical body 42 is provided with a clamp receiving slot 70 having an offset extension 71 in alignment with the deepest portion of recess 54. As an unexpanded clamp is inserted in slot 70, ends 38 and 40 readily align themselves with their respective recesses preparatory to the expansion of the clamp by operation of jaw 48.

Figure 2:
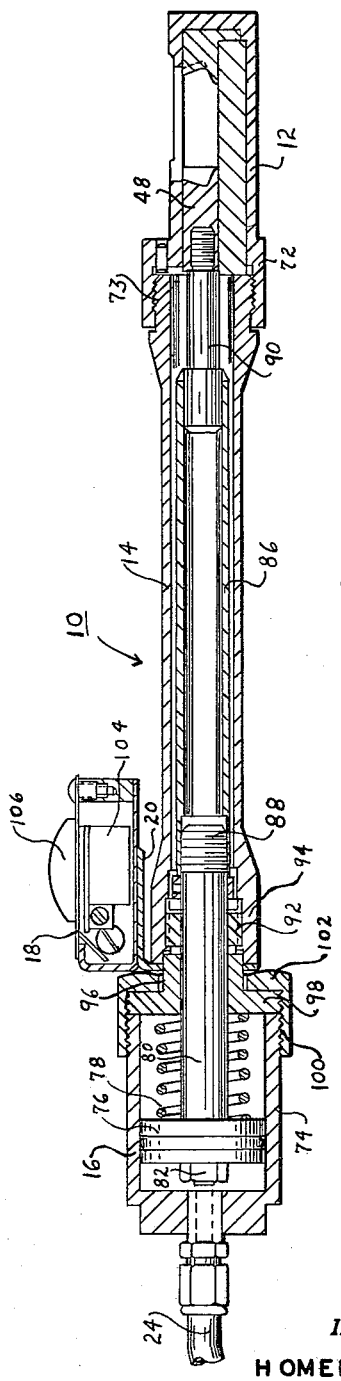
FIGURE 2 is a vertical cross sectional view through the clamp manipulating device taken on line 2—2 of FIGURE 1.

Operating head 12 is provided with an enlarged portion 72 for receiving one end of barrel 14, the barrel and head being securely joined to one another to form an integral rigid unit by threaded portion 73. Barrel 14 may be of any desired length, its size being determined by the intended use of the present clamp manipulating device. Connected to the end of barrel 14 opposite head 12 is a pneumatic cylinder 16 consisting of cylindrical walls 74 in which is disposed a piston 76 movable from the left hand end of cylinder 16, as shown in FIGURE 2, to the right hand end of said cylinder by air admitted through tube 24 into the left hand end of the cylinder and movable from the right hand end to the left hand end of the cylinder by a coil spring 78. Piston 76 is connected through hollow barrel 14 with movable jaw 48 by a rod 80, rigidly secured to piston 76 by a nut 82 threadedly received on a reduced diameter portion of rod 80 extending through piston 76, a tubular member 86 connected to rod 80 by threaded portion 88, and a stem 90 rigidly secured to tubular member 86 by welding, brazing or other suitable means and threadedly secured to jaw 48. The rod 80, member 86 and stem 90 form a unitary structure through which the movement of piston 76 is transmitted directly to movable jaw 48. Member 86 is spaced from the internal wall of barrel 14 to permit free reciprocating movement of the member in the barrel, and is held in spaced relation to the internal wall of the barrel by bushing 92 seated in the enlarged end 94 of the barrel, and slidably receiving stem 80 therein. Any suitable means can be used in connecting barrel 14 to cylinder 74, the construction shown consisting of a nipple 96 having a disc shaped flange 98 thereon for seating over one end of cylinder 74, and internally threaded coupling 100 threadedly received on cylinder 74 and having a flange 102 for clamping flange 98 firmly against the adjacent end of cylinder 74.

The control switch for operating the present clamp manipulating device is a conventional micro-switch 104 actuated by a conveniently placed button 106 which is operated by the one using the clamp with the hand holding the present device.

In using the present clamp manipulating device, the operator grasps the device with his hand around cylinder 16 and his thumb or one of his fingers on button 106 of switch 18. A clamp is then placed loosely in slot 70 without any effort necessarily being made to align members 38 and 40 with recesses 54 and 56, respectively. The operator then presses button 106 operating the solenoid control valve (not shown), thereby admitting compressed air into the left hand end of cylinder 74, and moving piston 76 to the right, as viewed in FIGURE 2, and, through rod 80, tubular member 86 and stem 90, moving movable jaw 48 toward stationary jaw 50. As movable jaw 48 advances, it engages member 38 of clamp 30, causing member 38 to seat in recess 54, and further advancement of movable jaw 48 causes member 40 to seat in recess 56. Thereafter, further pressure of jaw 48 on member 38 presses members 38 and 40 toward each other, expanding annular portion 32 of clamp 30 in the manner illustrated in FIGURE 7. In view of the downwardly and inwardly tapering walls 58 and 62 of recesses 54 and 56, respectively, clamp 30 is held firmly in head 12 by the advanced position of jaw 48 and can be readily inserted in a restricted area and assembled on the end of a hose to form the desired connection. As soon as clamp 30 has been placed in position on the end of the hose, the operator releases button 106, thereby permitting the solenoid control valve to close and simultaneously relieve the air pressure in the left hand end of cylinder 74. When this pressure is relieved, spring 78 and the inherent resiliency of annular member 32 of clamp 30 retract jaw 48 and permit the clamp to seat firmly on the end of the hose and form the connection. Piston 76 is returned by spring 78 in cylinder 74 to the left hand end of said cylinder, thereby moving movable jaw 48 to its fully retracted position, as shown in FIGURE 6.

While, in the preferred form of the present clamp manipulating device, the operation is performed by a pneumatic cylinder, other well known actuating mechanisms may be used if desired. For example, cylinder 74 may be replaced by a solenoid operating on rod 80 to move member 86 and stem 90 to the right, as viewed in FIG. 2, to operate movable jaw 48. The solenoid can be operated by the same type of switch in the same general location as switch 18 shown in the drawings. As a further alternative, piston 76 may be operated by a suitable hydraulic fluid supplied from a hydraulic system and controlled by a solenoid valve through switch 18.

While only one embodiment of the present invention has been shown and described in detail herein, various modifications and changes, in addition to those mentioned above, may be made without departing from the scope of the present invention.

I claim:

1. A device for expanding and holding a clamp consisting of a single loop of wire and radially extending ends, comprising a hollow elongated cylindrical barrel, an operating head on one end of said barrel, said head having a member forming a longitudinal track, a slot in said head paralleling said track with two offset portions, a stationary jaw at one end of said track and a movable jaw in said track at the other end thereof, said track maintaining said movable jaw in a constant angular relationship to said stationary jaw as it moves along the track, said jaws each having an inwardly and downwardly sloping wall forming a recess for holding an end of said clamp, the deepest portion of said recesses being offset from one another in the same direction as the offset portions of said slot, a pneumatic cylinder secured to the other end of said barrel, a piston in said cylinder, a linkage connecting said piston with said movable jaw movable in the direction of said head to operate said movable jaw, a spring in said cylinder for moving said piston in the direction away from said head to retract said movable jaw, a conduit for connecting said cylinder on the side of said piston opposite said spring with a source of compressed air, and a switch mounted on said device adjacent said cylinder for controlling the operation of said cylinder and piston.

2. A device for expanding and holding a clamp consisting of a single loop of wire and radially extending ends, comprising a hollow elongated barrel, an operating head on one end of said barrel, said head having a member forming a longitudinal track, a slot paralleling said track with two offset portions, a stationary jaw at one end of said track and a movable jaw in said track at the other end thereof, said track maintaining said movable jaw in a constant angular relationship to said stationary jaw as it moves along the track, said jaws each having an inwardly and downwardly sloping wall forming a recess for holding an end of said clamp, the deepest portion of said recesses being offset from one another in the same direction as the offset portions of said slot, a pneumatic cylinder secured to the other end of said barrel, a piston in said cylinder, a linkage connecting said piston with said movable jaw for operating said jaw, a spring in said cylinder for moving said piston in the direction away from said head to retract said movable jaw, a conduit for connecting said cylinder with a source of compressed air, and means for controlling the operation of said cylinder and piston.

3. A device for expanding and holding a clamp consisting of a single loop of wire and radially extending ends, comprising a barrel, an operating head on one end of said barrel, said head having a member forming a longitudinal track, a slot paralleling said track with two offset portions, a stationary jaw at one end of said track and a movable jaw in said track at the other end thereof, said track maintaining said movable jaw in a constant angular relationship to said stationary jaw as it moves along the track, said jaws each having an inwardly and downwardly sloping wall forming a recess for holding an end of said clamp, the deepest portion of said recesses being offset from one another in the same direction as the offset portions of said slot, a power operated means secured to the other end of said barrel, a linkage connecting said power operated means with said movable jaw, a spring for retracting said movable jaw, and means mounted on said device adjacent said cylinder for controlling the operation of said power operated means.

4. A device for expanding and holding a clamp consisting of a single loop of wire and radially extending ends, comprising a barrel, an operating head on one end of said barrel, said head having a member forming a longitudinal track, a stationary jaw at one end of said track and a movable jaw in said track at the other end thereof, said track maintaining said movable jaw in a constant angular relationship to said stationary jaw as it moves along the track, said jaws each having an inwardly and downwardly sloping wall forming a recess for holding an end of said clamp, the deepest portion of said recesses being offset from one another, a power operated means secured to the other end of said barrel, a means connecting said power operated means with said movable jaw, means for retracting said movable jaw, and means for controlling the operation of said power operated means.

5. In a device for expanding and holding a clamp consisting of a single loop of wire and radially extending ends: an operating head having a member forming a longitudinal track, a slot paralleling said track with two offset portions, a stationary jaw at one end of said track, a movable jaw in said track at the other end thereof, said track maintaining said movable jaw in a constant angular relationship to said stationary jaw as it moves along the track, said jaws each having an inwardly and downwardly sloping wall forming a recess for holding an end of said clamp, the deepest portion of said recesses being offset from one another in the same direction as the offset portions of said slot, and a power operated means for operating said movable jaw.

6. In a device for expanding and holding a clamp consisting of a single loop of wire and radially extending ends: an operating head having a member forming a longitudinal guide means, a stationary jaw at one end of said guide means, a movable jaw on said guide means at the other end thereof, said guide means maintaining said movable jaw in a constant angular relationship to said stationary jaw as it moves along the guide means, said jaws each having an inwardly and downwardly sloping wall forming a recess for holding an end of said clamp, the deepest portion of said recesses being offset from one another in the same direction as the offset portions of said slot, and a power operated means for operating said movable jaw.

References Cited in the file of this patent
UNITED STATES PATENTS

| | | |
|---|---|---|
| 2,400,140 | Sargeson | May 14, 1946 |
| 2,644,194 | Fill | July 7, 1953 |
| 2,815,646 | Swanson | Dec. 10, 1957 |
| 2,898,789 | Meese | Aug. 11, 1959 |
| 2,910,899 | Pasqualone et al. | Nov. 3, 1959 |

FOREIGN PATENTS

| | | |
|---|---|---|
| 162,466 | Austria | Mar. 10, 1949 |